(12) United States Patent
Lysen et al.

(10) Patent No.: US 10,302,501 B2
(45) Date of Patent: May 28, 2019

(54) MEASURING DEVICE TO BE PLACED ON SUPPORTING SURFACES OF OBJECTS BEING MEASURED

(71) Applicant: Prüftechnik Dieter Busch AG, Ismaning (DE)

(72) Inventors: Heinrich Lysen, Garching (DE); Johann Lösl, Buch am Erlbach (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 313 days.

(21) Appl. No.: 15/508,892

(22) PCT Filed: Sep. 3, 2015

(86) PCT No.: PCT/DE2015/200448
§ 371 (c)(1),
(2) Date: Mar. 3, 2017

(87) PCT Pub. No.: WO2016/034177
PCT Pub. Date: Mar. 10, 2016

(65) Prior Publication Data
US 2017/0205293 A1      Jul. 20, 2017

(30) Foreign Application Priority Data

Sep. 4, 2014   (DE) .................. 10 2014 217 706

(51) Int. Cl.
*B23Q 3/15*      (2006.01)
*B23Q 9/02*      (2006.01)
(Continued)

(52) U.S. Cl.
CPC .......... *G01K 1/143* (2013.01); *B23Q 3/1546* (2013.01); *B23Q 9/02* (2013.01); *G01C 9/02* (2013.01);
(Continued)

(58) Field of Classification Search
CPC .......... B23Q 3/00; B23Q 3/15; B23Q 3/1546; B23Q 9/02; B65G 2203/042; G01C 9/02; G01K 1/14; G01K 1/143
See application file for complete search history.

(56) References Cited

U.S. PATENT DOCUMENTS 2,779,810 A * 1/1957 Horbinski .............. G01K 1/143
                                                                    136/221
5,726,911 A    3/1998 Canada et al.
(Continued)

FOREIGN PATENT DOCUMENTS

DE    3127389 A1    2/1983
DE    4223453 A1    1/1994
(Continued)

OTHER PUBLICATIONS

SKF, Wireless Machine Condition Detector CMVL 8000 für die Verwendung mit dem SKF MARLIN-Datenmanager, Druckschrift CM2379 Jul. 2008, Germany http://www.skfmaintenanceservices.de/uploads/media/WMCD_D.pdf http://www.skf.com/binary/tcm:12-143465/CM2379_WMCD_D.pdf.
(Continued)

*Primary Examiner* — Nguyen Q. Ha
(74) *Attorney, Agent, or Firm* — Millman IP Inc.

(57) ABSTRACT

A measuring device is provided which, in order to measure measured variables of an object being measured, can be placed on a surface of the object being measured. The surface supports the measuring device. The measuring device comprises at least three projecting contact surfaces, the center points of which are distributed substantially uniformly along a circle. The projecting contact surfaces, when the measuring device is placed on the surface of an object being measured, lie against the surface and are supported by the surface. A first of the contact surfaces comprises a temperature sensor for measuring the surface
(Continued)

temperature of the object being measured, while a second and a third of the contact surfaces are provided to measure respective other measured variables.

9 Claims, 2 Drawing Sheets

(51) Int. Cl.
    *G01K 1/14*           (2006.01)
    *B23Q 3/154*        (2006.01)
    *G01C 9/02*           (2006.01)

(52) U.S. Cl.
    CPC .......... *G01K 1/14* (2013.01); *B65G 2203/042* (2013.01)

(56) References Cited

U.S. PATENT DOCUMENTS

| | | | |
|---|---|---|---|
| 6,892,581 B2 | 5/2005 | Robinson et al. | |
| 7,796,051 B2 * | 9/2010 | Rajala | G01H 1/003 340/679 |
| 2002/0000126 A1 | 1/2002 | Barclay | |
| 2011/0279952 A1 | 11/2011 | Sonyey et al. | |
| 2013/0276541 A1 | 10/2013 | Busch et al. | |
| 2014/0105248 A1 * | 4/2014 | Daily | G01K 1/143 374/179 |
| 2015/0181313 A1 * | 6/2015 | Murphy | H04Q 9/00 340/870.02 |
| 2016/0161341 A1 * | 6/2016 | Yumoto | F16B 2/10 248/230.4 |

FOREIGN PATENT DOCUMENTS

| | | | | |
|---|---|---|---|---|
| DE | 4322825 C1 | | 10/1994 | |
| DE | 102010056466 A1 | | 7/2012 | |
| DE | 102012014277 A1 | | 2/2013 | |
| GB | 2187294 A | | 9/1987 | |
| JP | 61243333 A | * | 10/1986 | ............ G01K 1/143 |
| JP | H028715 A | | 1/1990 | |
| JP | H028716 A | | 1/1990 | |
| JP | H07139994 A | | 6/1995 | |
| JP | H08136407 A | | 5/1996 | |
| WO | WO-2015118326 A1 | * | 8/2015 | ............ G01D 11/30 |

OTHER PUBLICATIONS

Pruftechnik Condition Monitoring GMBH, Sensors, cables and accessories; Catalog: Pruftechnik Condition Monitoring, Edition Dec. 2012, material No. LIT 01.700.EN, p. 64 VIB 6.162 VT, p. 85 VIB 3.420, Germany http://www2.pruftechnik.com/fileadmin/user_upload/COM/Condition_Monitoring/Products/catalog/english/Cable_catalog_chapt4_5_6_122012_en.pdf.
Pruftechnik Condition Monitoring GMBH, Vibscanner smartSCANNER, Machine diagnostics, Data collection, Field balancing, Shaft alignment; Catalog: Prüftechnik Condition Monitoring, Edition: Dec. 2012 material No. LIT 54.700.EN, p. 54 SYS 7.460-B2P, Germany http://www2.pruftechnik.com/fileadmin/user_upload/COM/Condition_Monitoring/Products/catalog/english/vibscanner_catalog_122012_en.pdf.
Prüftechnik Condition Monitoring GMBH, Wireless Condition Monitoring Vibconnect RF, Prüftechnik Condition Monitoring, material No. LIT 72.400.05.12.EN, Germany http://www2.pruftechnik.com/fileadmin/user_upload/COM/Condition_Monitoring/Products/Online_Systems/VIBCONNECT_RF/docs/VIBCONNECT_brochure_EN.pdf, Year 2010.
DE 102014217706.5, German Search Report, German Patent Office, dated Jun. 8, 2015.
PCT/DE2015/200448, International Search Report, European Patent Office, dated Jan. 15, 2016.

* cited by examiner

MEASURING DEVICE TO BE PLACED ON SUPPORTING SURFACES OF OBJECTS BEING MEASURED

The present invention relates to a measuring device which, in order to measure measured variables of an object being measured, can be placed on a surface of the object being measured which supports the measuring device.

Measuring devices which, to measure specific measured variables of objects being measured, are placed on the surface of the objects being measured, are known in principle. Thus, for example, a holding device for an object recording measured variables is disclosed in DE 43 22 825 C1, which device can be clamped magnetically on a magnetizable area of a flat or curved body. To this end, a plunger-like pole shoe is displaceably formed, so that it is displaced toward the contact surface by the magnetic force when the holding device is put in place. The pole shoe can be designed to pick up oscillation and/or acceleration variables but also to pick up other measured variables such as the temperature.

Furthermore, JP 07139994 A discloses an oscillation measuring device, which can be placed with three contact surfaces on the surface of an object being measured and can be held temporarily on the object being measured. Arranged in the interior of the oscillation measuring device are three oscillation sensors, which are able to detect respective oscillations in mutually orthogonal directions. Another oscillation measuring device having a magnetic holder is disclosed in JP 02008715 A.

Moreover, DE 10 2010 056 466 A1 shows an oscillation measuring device which, although it comprises two oscillation sensors and a temperature sensor, is provided to be coupled to a measuring point set up for the purpose on the object being measured by using a measuring pin but not to be placed on supporting surfaces of objects being measured.

In view of the aforementioned prior art, the object of the present invention is to devise a measuring device which is distinguished firstly by a compact structure and secondly by the highest possible stability when, in order to measure measured variables of an object being measured, the measuring device is placed on a surface of the object being measured.

This object is achieved by the measuring device having the features of claim 1. Preferred embodiments are the subject matter of the dependent claims.

According to the present invention, the measuring device comprises at least three projecting contact surfaces, the center points of which are distributed substantially uniformly along an imaginary circle and which, when the measuring device is placed on the surface of an object being measured, lie against said surface and are supported by the surface. In other words, the center points of each two adjacent contact surfaces have an angular spacing of substantially 120°. In this way, the measuring device is imparted high stability, since the three contact surfaces act like a tripod carrying or supporting the measuring device, which in principle ensures a particularly stable state. Because the stability of a tripod is comparatively undemanding as regards the evenness and shape of the base, the design of the contact surfaces in the manner of a tripod has an advantageous effect on the stability of the measuring device, in particular when the measuring device is placed on uneven surfaces. Advantageously, the contact surfaces are additionally equidistant from one another, i.e. their spacings along straight lines are substantially equal in each case. This can be implemented in a simple manner, for example, by all contact surfaces having the same shape and size and in particular when all the contact surfaces are formed so as to be circular and with the same diameter.

Furthermore, according to the invention, a first of the contact surfaces comprises a temperature sensor for measuring the surface temperature of the object being measured, while a second and third of the contact surfaces are provided to measure respective other measured variables, by which means the measuring device according to the invention is implemented in an overall space-saving manner. In particular, the integration of the temperature sensor in one of the contact surfaces of the measuring device leads to a considerable saving in space, since temperature sensors of temperature measuring devices for measuring the temperature of the object being measured normally have to be provided with a certain amount of space on the surface of the object being measured, on which the temperature sensor can come into contact with the surface. Thus, for example, it is no longer necessary to have the temperature sensor project from a housing of the measuring device. In the measuring device of the present invention, the space saving is advantageously increased still further by the provision of the two other contact surfaces for measuring respective other measured variables. In conjunction with the tripod design of the contact surfaces, moreover, thanks to the high stability of tripods, good contact between the contact surfaces and the temperature sensor and the surface of the object being measured, and therefore reliable measurement of the measured variables to be measured, is ensured. Here, the measuring device can be held on the object being measured by means of a magnetic holder or can have at least one magnet, so that it can be fixed to the surface of the object being measured by means of the magnetic forces exerted by the magnets.

In a preferred embodiment of the measuring device according to the invention, the second contact surface is a part of a first vibrometer for measuring oscillations of the object being measured. For this purpose, the measuring device can have at least one oscillation sensor or acceleration sensor. The latter can be a mono-axial oscillation sensor, which measures oscillations or vibrations in one direction, usually in a direction normal to the surface of the object being measured, or a three-axial oscillation sensor, which measures oscillations or vibrations in three mutually perpendicular directions, one of these directions usually being a direction normal to the surface of the object being measured.

The acceleration sensors can be any desired acceleration sensors, such as, for example, known micromechanical (MEMS) or piezoelectric acceleration sensors.

Since frequencies occurring in machine installations normally lie in the range from 0 Hz to 40 kHz, the first vibrometer is particularly preferably an acceleration sensor for measuring oscillations in the range from 0 Hz to 1 kHz. For example, the first vibration sensor or the acceleration sensor can have a three-axial oscillation sensor which is capable of measuring linear oscillations in three spatial directions and is particularly well-suited to acceleration measurements in the range from 0 Hz to 1 kHz, so that even angles to the vertical, i.e. the perpendicular towards the center of the Earth, can therefore be determined. This may be advantageous, for example, for determining or verifying a measured position on the object being measured or for a coordinate transformation of the measured values from the measuring direction into a machine direction.

Particularly preferably, the third contact surface is part of a second vibrometer for measuring oscillations of the object being measured which are of higher frequency than the oscillations of the object being measured that are measured by the first vibrometer. This high-frequency acceleration sensor can be a MEMS component or piezoelectric acceleration sensor or it can have a MEMS component or piezoelectric acceleration sensor, which can measure in only one spatial direction and, with a resonant frequency of 22 kHz or more, may be suitable as a sensor for shock waves. Such shock waves are produced by the movement of mechanically damaged areas, for example of rolling bodies when impacting the inner or outer ring of a bearing. In a further preferred embodiment, the first vibrometer and/or the second vibrometer have a MEMS component which is provided or designed to determine a direction with respect to the perpendicular to the center of the earth.

Advantageously, each of the contact surfaces can be assigned at least one magnet, wherein the measuring device can be fixed to the surface of the object being measured by means of magnetic forces exerted by the magnets. In this way, a holding mechanism that is simple and economical to produce is realized, which additionally permits rapid and convenient coupling and uncoupling of the measuring device to and from the object being measured. In addition, as a result of the arrangement of the magnets, which preferably all exert identical and equally intense magnetic forces, and their uniform magnetic attraction forces produced hereby, mechanically stable placement of each individual one of the three contact surfaces on the object being measured is ensured. These magnets are preferably permanent magnets, but electromagnets can likewise also be provided.

Particularly preferably, at least one of the magnets is designed to be movable. Such a magnet can even adapt to highly uneven or non-uniformly formed surfaces of the object being measured, by which means the greatest possible contact force of the measuring device on the object being measured and, as a result, the best possible contact of the contact surfaces with the surface of the object being measured are achieved. Good contact of the contact surfaces with the surface of the object being measured in turn has a beneficial effect on the operation of the measuring device, since measurements carried out by the measuring device are less subject to error and are generally more reliable.

The measuring device according to the invention can have at least one processor and/or at least one data memory and/or at least one interface for data transmission and/or at least one energy source and/or at least one connection for an energy source. If the measuring device has a processor, the latter can itself further process or evaluate measured data from the measured variables. If, on the other hand, the measuring device has a data memory instead of the processor, then measured data can be stored in this data memory and read out of the latter again at a later time. A measuring device which comprises both a processor and a data memory is capable either of processing measured data itself by using the processor and of storing the processed measured data in the data memory to be read later, or it is capable of storing the measured data temporarily in unprocessed form in the data memory for subsequent processing or reading. By means of the interface, the measuring device can be connected to a data collector, a higher-order computer, a laptop, a Notebook, a smart phone, the Internet or any other desired computer network, in order to be able transmit measured data to other devices. In addition, the measuring device can be designed to be controllable via the interface, wherein it can be configured to receive external control commands via the interface. Furthermore, the measuring device can be provided with an internal energy source or connectable to an external energy source by using the connection for an energy source. Batteries or accumulators are suitable as the internal energy source of the measuring device, while a connecting socket or connector cable can be provided as the connection for an energy source.

If the measuring device according to the invention has at least one interface, this can be an interface for a cable-bound or wire-free data transmission. For example, a cable-bound interface can be implemented as a plug-in connection and in particular as a USB interface (Universal Serial Bus). Quite generally, however, any other wire-bound interfaces can also be provided, such as, for example, serial interfaces in accordance with the RS-232 standard. On the other hand, an interface for wire-free data transmission can be implemented with commercially available components. For example, wire-free data transmission in accordance with the wireless USB standard or in accordance with the industrial standard called Bluetooth according to IEEE 802.15.1 for the data transmission between devices over short distances by radio technology can be provided. In such cases, the interface has an antenna unit.

The invention will be explained in more detail below by using a preferred exemplary embodiment. In the figures.

Figure 1:
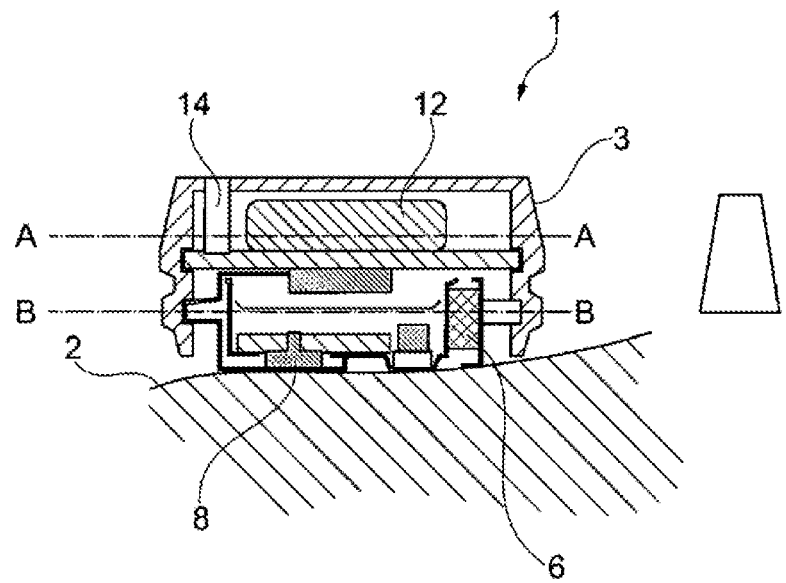
FIG. 1 shows a schematic cross section through a measuring device according to the invention.
Figure 2:
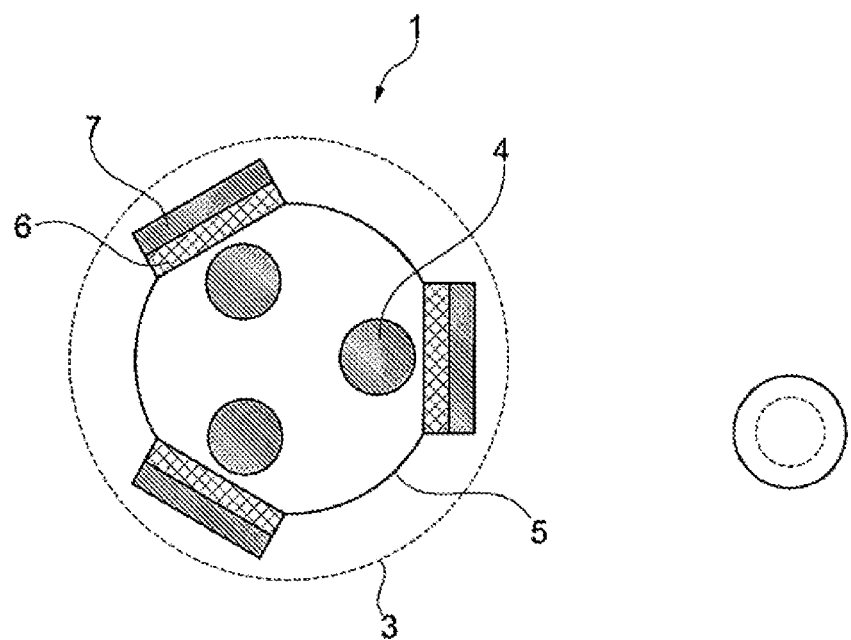
FIG. 2 shows a lower side of the measuring device shown in FIG. 1.
Figure 3:
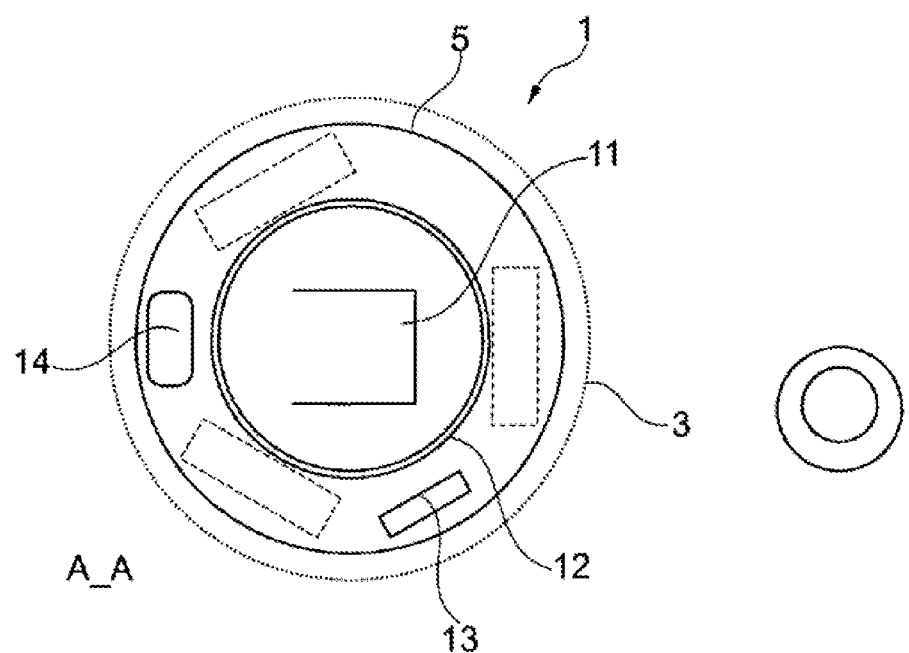
FIG. 3 shows a section along the line A-A through the measuring device shown in FIG. 1.
Figure 4:
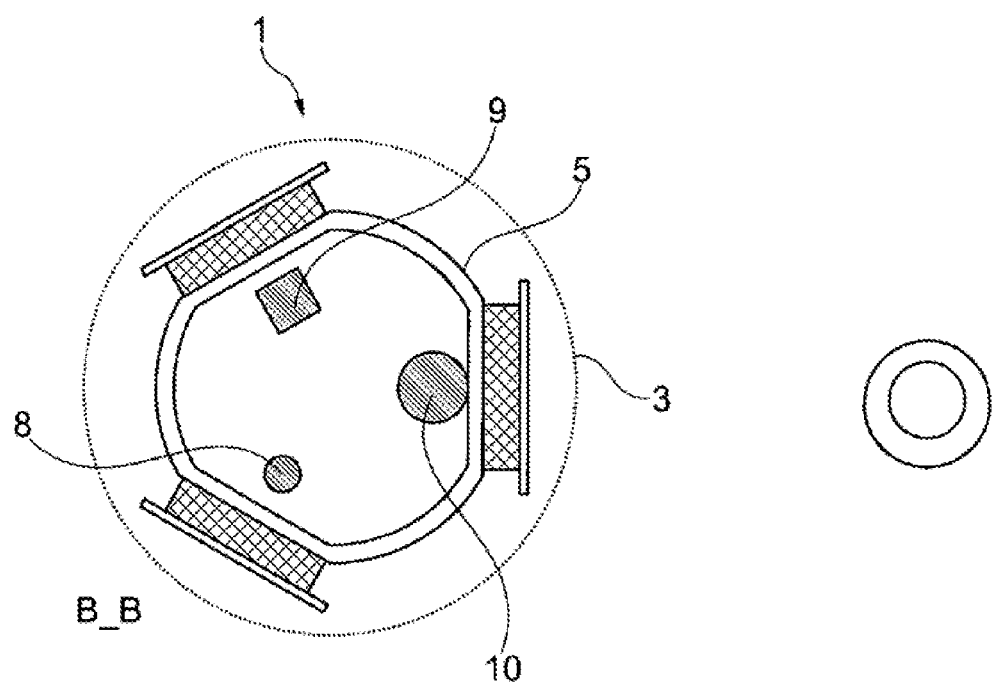
FIG. 4 shows a section along the line B-B through the measuring device shown in FIG. 1.

A measuring device 1 according to the present invention is illustrated in cross section in FIG. 1. The measuring device 1 in FIG. 1 is placed on an uneven surface of a machine 2 to be measured and therefore serving as an object being measured. FIG. 2 shows the measuring device 1 in a viewing direction onto a lower side, which faces the surface of the machine 2 in FIG. 1. Furthermore, a section through the measuring device 1 along a line designated by A-A in FIG. 1 is shown in FIG. 3, and a section through the measuring device 1 along a line designated by B-B in FIG. 1 is shown in FIG. 4.

As emerges from FIGS. 1 and 2, the measuring device 1 has a rubber shell 3 with a flat, slightly frustoconical shape. On the lower side, which faces the machine 2 when the measuring device 1 is placed on the machine 2, three projecting feet 4 with respective flat contact surfaces are provided, distributed uniformly along an imaginary circle, which come into contact with the surface of the machine 2 when the measuring device 1 is placed on the machine 2 as in FIG. 1. Furthermore, within the rubber shell 3, three magnets 6 with respective magnetic poles 7 are flange-mounted laterally along a circular inner structural element 5 which encloses the three feet 4 from the viewing direction of FIG. 2, and which is concentric with the imaginary circle on which the feet 4 are arranged. Each one of the magnets 6 is respectively assigned to one of the feet 4 in such a way that, from the viewing direction of FIG. 2, both the projecting foot 4 located within the structural element 5 and the magnet 6 arranged outside on the structural element 5 are pierced centrally by an imaginary straight line originating radially from the center point of the structural element 5.

The contact surface of one of the feet 4 comprises a temperature sensor 8 which, when the measuring device 1 is placed on the machine 2 as shown in FIG. 1, comes into contact with the surface of the measuring device 1. Since the temperature sensor 8 is integrated in one of the feet 4 or in the contact surface thereof, a compact design of the measuring device 1 is achieved, since the temperature sensor 8 for measuring the surface temperature of the machine 2 does not have to be placed on the machine 2 from outside the rubber shell 3 of the measuring device 1. Furthermore, the two other feet 4 or contact surfaces of the measuring device are assigned respective acceleration sensors, wherein, as shown in FIG. 4, one of the acceleration sensors is implemented by an MEMS component 9, and the other acceleration sensor is a piezoelectric acceleration sensor 10. In addition, as can be seen in FIG. 3, the measuring device 1 comprises a processor 11, an accumulator 12 as energy source, an antenna 13 for wire-free communication and a USB interface 14 for the wire-bound connection of the measuring device 1 to external devices not shown in the figures.

Since the measuring device 1 has three feet 4 projecting and distributed uniformly along an imaginary circle and having respective flat, circular contact surfaces of equal size, not only are the center points of the feet 4 and of the contact surfaces arranged with equidistant angular spacings along the measuring circle, but the feet 4 and the contact surfaces thereof are also spaced apart equidistantly from one another at linear spacings. Thus, the feet 4 for the measuring device 1 bring with them the static action of a tripod, which ensures high stability on relatively uneven bases.

To this extent, the measuring device 1 as shown in FIG. 1 is granted secure stability on the unevenly running surface of the machine 2 merely through the specific arrangement of the feet 4. This is increased still further by the action of the magnets 6 if the surface of the machine 2 is made of a metallic material which is attracted by the magnets 6. On account of the magnetic force exerted on the surface of the machine 2 by the magnets 6, in such a case the measuring device 1 is pressed onto the machine 2. In this way, reliable contact between the feet 4 and the contact surfaces thereof and the surface of the machine 2 is ensured.

Secure contact between the feet 4 and the surface of the machine 2 is important for the reliability of the measurements carried out by the measuring device 1. Thus, a measurement of the surface temperature of the machine 2 with the measuring device 1 can be carried out reliably only when the foot 4 of the measuring device 1 that comprises the temperature sensor 8 is resting securely on the surface of the machine 2. Likewise, the MEMS component 9 and the piezoelectric acceleration sensor 10 can detect vibrations of the machine 2 reliably only if the feet 4 of the measuring device 1 that are assigned to them have secure contact with the surface of the machine 2, since only then can vibrations of the machine 2 be transferred reliably to the respective acceleration sensors via the contact surfaces of the feet 4.

In operation, as illustrated in FIG. 1, the measuring device 1 is then placed on a surface of a machine 2, uneven under certain circumstances, the surface temperature and vibrations of which are to be measured by the measuring device 1. The measuring device 1 is attracted to the machine 2 by the magnets 6, which means that the feet 4 and the contact surfaces thereof come into secure contact with that uneven surface of the machine 2 which is shown in FIG. 1, and the measuring device 1 rests firmly on the machine 2. By means of the accumulator 12, the measuring device 1 is supplied with the energy needed for the operation.

Under the control of the processor 11, the measuring device 1 then carries out its measurements. Here, the surface temperature of the machine 2 is detected by the temperature sensor 8, while the MEMS component 9 and the piezoelectric acceleration sensor 10 detect vibrations of the machine 2.

The temperature measurement and the vibration measurements can all be carried out simultaneously or optionally also individually, for example one after another. Finally, the data acquired can be transmitted in real time via the antenna 13 to another device, not shown in the figures, or else they are stored temporarily in an intermediate memory, not shown in the figures, and read out via the USB interface 14 at a later time. Furthermore, during its operation and in particular during the execution of one or more measurements, the measuring device 1 can be controlled in a wire-free manner via the antenna 13 or in a cable-bound manner via the USB interface 14.

LIST OF DESIGNATIONS

1 Measuring device
2 Machine
3 Rubber shell
4 Foot
5 Structural element
6 Magnet
7 Magnetic pole
8 Temperature sensor
9 MEMS component
10 Piezoelectric acceleration sensor
11 Processor
12 Accumulator
13 Antenna
14 USB interface

The invention claimed is:

1. A measuring device which, in order to measure measured variables of an object being measured, can be placed on a surface of the object being measured, which surface supports the measuring device, said measuring device comprising at least three projecting contact surfaces, the center points of which are distributed substantially uniformly along a circle and which, when the measuring device is placed on the surface of an object being measured, lie against said surface and are supported by the surface, wherein a first of the contact surfaces comprises a temperature sensor for measuring the surface temperature of the object being measured, while a second and a third of the contact surfaces are provided to measure respective other measured variables.

2. The measuring device as claimed in claim 1, in which the second contact surface is a part of a first vibrometer for measuring oscillations of the object being measured.

3. The measuring device as claimed in claim 2, in which the first vibrometer has a MEMS component, which is provided or designed to determine a direction with respect to the perpendicular towards the center of the Earth.

4. The measuring device as claimed in claim 2, in which the third contact surface is part of a second vibrometer for measuring oscillations of the object being measured which are of higher frequency than the oscillations of the object being measured that are measured by the first vibrometer.

5. The measuring device as claimed in claim 4, in which the first vibrometer and/or the second vibrometer has a MEMS component, which is provided or designed to determine a direction with respect to the perpendicular towards the center of the Earth.

6. The measuring device as claimed in claim 2, in which each of the contact surfaces is assigned at least one magnet, wherein the measuring device can be fixed to the surface of the object being measured by means of magnetic forces exerted by the magnets.

7. The measuring device as claimed in claim 6, in which at least one of the magnets is designed to be movable.

8. The measuring device as claimed in claim 2, which has at least one processor and/or at least one data memory and/or at least one interface for data transmission and/or at least one energy source and/or at least one connection for an energy source.

9. The measuring device as claimed in claim 8, in which the at least one interface is provided for cable-bound or wire-free data transmission.

\* \* \* \* \*